(12) United States Patent
Petersen et al.

(10) Patent No.: US 9,487,084 B2
(45) Date of Patent: Nov. 8, 2016

(54) ELECTRIC DRIVE AND DRIVE CONFIGURATION FOR A MOTOR VEHICLE

(71) Applicant: VOLKSWAGEN AKTIENGESELLSCHAFT, Wolfsburg (DE)

(72) Inventors: Rainer Petersen, Wolfsburg (DE); Jörg Möckel, Sassenburg (DE); Armin Sue, Meine (DE); Henning Strauβ, Uetze (DE); Robert Plikat, Ummern (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 14/986,049

(22) Filed: Dec. 31, 2015

(65) Prior Publication Data
US 2016/0114676 A1 Apr. 28, 2016

Related U.S. Application Data

(63) Continuation of application No. PCT/EP2014/061670, filed on Jun. 5, 2014.

(30) Foreign Application Priority Data

Jul. 2, 2013 (DE) .......................... 10 2013 212 868

(51) Int. Cl.
*B60K 17/08* (2006.01)
*H02K 7/116* (2006.01)
(Continued)

(52) U.S. Cl.
CPC ................. *B60K 17/08* (2013.01); *B60K 1/02* (2013.01); *B60K 17/16* (2013.01); *B60L 15/2036* (2013.01);
(Continued)

(58) Field of Classification Search
CPC ............................... B60K 17/08; F16H 48/11
See application file for complete search history.

(56) References Cited

U.S. PATENT DOCUMENTS 2,215,646 A * 9/1940 Kuhns .................... H02K 16/00
290/4 R
3,475,993 A 11/1969 Hewko
(Continued)

FOREIGN PATENT DOCUMENTS

DE 728469 C 11/1942
DE 737859 C 7/1943
(Continued)

OTHER PUBLICATIONS

Search Report including Provisional Assessment of Patentability issued by the German Patent and Trademark Office for German Patent Application No. DE 10 2013 212 868.1, dated Apr. 10, 2014.
(Continued)

*Primary Examiner* — Derek D Knight
(74) *Attorney, Agent, or Firm* — Manfred Beck, P.A.

(57) ABSTRACT

An electric drive includes a motor configuration with a plurality of electric machines, an output configuration, and a transmission stage. The output configuration has a summing stage configured as a Ravigneaux set with a summing internal gear, a summing spider, two sets of summing planets, and two summing suns. The transmission stage has a transmission sun, transmission planets, and a rotatably mounted transmission internal gear. The transmission sun is connected to the output configuration. The transmission planets are each connected to a respective one of the electric machines. The transmission planets roll on the transmission sun and on the transmission internal gear in a torque-transmitting manner. The transmission internal gear is fixedly connected to one of the two summing suns. The transmission sun is fixedly connected to another one of the two summing suns. A drive configuration for a motor vehicle is also provided.

9 Claims, 6 Drawing Sheets

(51) Int. Cl.

| | | |
|---|---|---|
| *H02K 16/00* | (2006.01) | |
| *F16H 13/02* | (2006.01) | |
| *F16H 13/10* | (2006.01) | |
| *F16H 37/08* | (2006.01) | |
| *B60L 15/20* | (2006.01) | |
| *B60K 1/02* | (2006.01) | |
| *B60K 17/16* | (2006.01) | |
| *F16H 3/66* | (2006.01) | |
| *F16H 48/11* | (2012.01) | |

(52) U.S. Cl.
CPC .......... *B60L 15/2054* (2013.01); *F16H 3/663* (2013.01); *F16H 13/02* (2013.01); *F16H 13/10* (2013.01); *F16H 37/0806* (2013.01); *F16H 37/0826* (2013.01); *F16H 48/11* (2013.01); *H02K 7/116* (2013.01); *H02K 16/00* (2013.01); *B60L 2220/42* (2013.01); *B60L 2220/50* (2013.01); *B60L 2240/12* (2013.01); *B60L 2240/421* (2013.01); *B60L 2240/423* (2013.01); *B60L 2240/486* (2013.01); *F16H 2200/0021* (2013.01); *F16H 2200/202* (2013.01); *Y02T 10/641* (2013.01); *Y02T 10/645* (2013.01); *Y02T 10/648* (2013.01); *Y02T 10/72* (2013.01); *Y02T 10/7275* (2013.01)

(56) References Cited

U.S. PATENT DOCUMENTS

| | | | | |
|---|---|---|---|---|
| 4,594,652 A | * | 6/1986 | Mattson | ................. G05B 19/40 318/46 |
| 4,691,119 A | | 9/1987 | McCabria | |
| 4,721,014 A | | 1/1988 | Ohkubo | |
| 4,779,486 A | | 10/1988 | Schumacher | |
| 4,798,999 A | | 1/1989 | Tecinsky | |
| 4,848,188 A | | 7/1989 | Schumacher | |
| 6,149,418 A | * | 11/2000 | O'Bryan | ............. B29C 45/5008 425/145 |
| 7,965,007 B2 | | 6/2011 | Dahlen | |
| 8,232,700 B2 | * | 7/2012 | Dooley | ................... H02K 16/02 310/113 |
| 2005/0140230 A1 | | 6/2005 | Johnson et al. | |

FOREIGN PATENT DOCUMENTS

| | | |
|---|---|---|
| DE | 1017697 A | 10/1957 |
| DE | 3617688 A1 | 12/1986 |
| DE | 3638422 A1 | 5/1987 |
| DE | 4402337 A1 | 8/1995 |
| DE | 20201748 U1 | 7/2002 |
| DE | 10034469 A1 | 9/2002 |
| DE | 102011079975 A1 | 1/2013 |
| EP | 0211000 B1 | 3/1991 |
| EP | 1481887 A1 | 12/2004 |
| EP | 2436950 A2 | 4/2012 |
| EP | 2460941 A1 | 6/2012 |
| GB | 2175656 A | 12/1986 |
| JP | 2011012722 A | 1/2011 |
| WO | 2011013347 A1 | 2/2011 |
| WO | 2012171177 A1 | 12/2012 |

OTHER PUBLICATIONS

International Search Report for International Application No. PCT/EP2014/061670 and translation thereof, dated May 22, 2015.
International Preliminary Report on Patentability for International Application No. PCT/EP2014/061670 including Written Opinion of the International Searching Authority and translation thereof, dated Jan. 5, 2016.

* cited by examiner

ELECTRIC DRIVE AND DRIVE CONFIGURATION FOR A MOTOR VEHICLE

CROSS-REFERENCE TO RELATED APPLICATIONS

This application is a continuation, under 35 U.S.C. §120, of copending International Application No. PCT/EP2014/061670, filed Jun. 5, 2014, which designated the United States; this application also claims the priority, under 35 U.S.C. §119, of German Patent Application No. DE 10 2013 212 868.1, filed Jul. 2, 2013; the prior applications are herewith incorporated by reference in their entirety.

BACKGROUND OF THE INVENTION

Field of the Invention

The invention relates to an electric drive, including a motor configuration with a plurality of electric machines, an output configuration, and a transmission stage which is connected to the motor configuration and also to the output configuration, wherein the transmission stage includes a transmission sun, which is connected to the output configuration, and a plurality of transmission planets, which are connected in each case to a respective one of the electric machines, wherein the transmission planets are disposed in an annular manner around the transmission sun and roll on the latter in a torque-transmitting manner.

Drives of this type are known from European Patent Document EP 0 211 000 B1, This document discloses an electromechanical precision drive system with a plurality of individual electric motors which are arranged in an annular manner with rotor shafts which are oriented in parallel. Each rotor shaft of the known system carries a spur gear which meshes with a common sun gear which is arranged in the center of the ring which is formed by the planetary gears. This configuration serves to sum the low torques of the individual electric machines to form a high overall torque which can be tapped off at the output shaft which is connected to the sun.

It would be favorable to be able to transfer this expedient concept to the drive of motor vehicles. To this end, in particular, the use of what are known as very high speed motors would be favorable, that is to say electric machines with rotational speeds of more than 20 000 rpm which are distinguished by particular efficiency and smooth running. Motors of this type are currently used in high-speed machine tools. The known precision drive system, supplemented by very high speed motors, is not readily suitable for the application as a motor vehicle drive, however. In particular, it does not supply a sufficient transmission ratio and the noise development which results at the tooth engagement points at high rotational speeds is also unacceptable for use in motor vehicles, in particular electrically operated motor vehicles.

SUMMARY OF THE INVENTION

It is accordingly an object of the invention to provide an electric drive and a drive configuration for a motor vehicle which overcome the above-mentioned disadvantages of the heretofore-known drive systems of this general type. It is in particular an object of the invention to provide an advancement in the development of the drive system of the generic type as described above, which is adapted to the use as a motor vehicle drive.

With the foregoing and other objects in view there is provided, in accordance with the invention, an electric drive including:
a motor configuration with a plurality of electric machines;
a housing;
an output configuration having a summing stage configured as a Ravigneaux set with a summing internal gear fixed relative to the housing, with a summing spider, with two sets of summing planets meshing with one another and being rotatably mounted on the summing spider, one of the two sets of summing planets meshing with the summing internal gear, and with two summing suns each meshing with a respective one of the two sets of summing planets; and
a transmission stage connected to the motor configuration and also connected to the output configuration, the transmission stage having a transmission sun and a plurality of transmission planets, the transmission sun being connected to the output configuration, the transmission planets each being connected to a respective one of the electric machines, the transmission planets being disposed in an annular manner around the transmission sun, the transmission planets rolling on the transmission sun in a torque-transmitting manner, the transmission stage having a rotatably mounted transmission internal gear, the transmission planets rolling on the transmission internal gear in a torque-transmitting manner, the transmission internal gear being fixedly connected to one of the two summing suns, and the transmission sun being fixedly connected to another one of the two summing suns.

In other words, the object of the invention is achieved by an electric drive including:
a motor configuration with a plurality of electric machines,
an output configuration, and
a transmission stage which is connected on the one hand to the motor configuration and on the other hand to the output configuration, with a transmission sun which is connected to the output configuration, and a plurality of transmission planets which are connected in each case to a respective one of the electric machines, are disposed in an annular manner around the transmission sun, and roll on the latter in a torque-transmitting manner,
the transmission stage has a rotatably mounted transmission internal gear, on which the transmission planets roll in a torque-transmitting manner, and
the output configuration has a summing stage which is configured as a Ravigneaux set with a summing internal gear which is fixed to the housing, with a summing spider on which two sets of summing planets which mesh with one another and of which one meshes with the summing internal gear are mounted rotatably, and with two summing suns, of which in each case one meshes with one of the summing planetary sets, wherein the transmission internal gear is connected fixedly to one of the summing suns, and the transmission sun is connected fixedly to the other one of the summing suns.

First of all, it is provided according to the invention to extend the conventional transmission stage to form a complete planetary stage with a dedicated internal gear, namely the transmission internal gear. The transmission planets are positioned in a substantially spatially fixed manner. They are fixed on the rotor shafts of the electric machine. The electric machines themselves are fixed on a reference base, in particular a transmission housing. A separate spider, on which the planets are usually mounted within a planetary stage, is therefore not required in the present case. However, the spatially fixed arrangement of the transmission planets results in the necessity to mount the transmission internal gear rotatably.

The transmission planets serve as input elements of the transmission stage. The latter has two output elements in the form of the transmission sun and the transmission internal gear. According to the invention, their rotational speeds and torques are summed in a summing stage which can be considered to be part of an output configuration which is provided downstream. The construction of the summing stage corresponds to that of a Ravigneaux set which is known in principle with a summing internal gear which is fixed relative to the housing, two sets of summing planets and two summing suns which in each case mesh with one of the summing planetary sets. The summing suns serve as input elements of the summing stage and are correspondingly connected to the output elements of the transmission stage, that is to say the transmission sun and the transmission internal gear. As a consequence, the summing spider, on which the summing planetary sets are mounted, serves as an output element of the summing stage.

By way of this special transmission configuration, it is possible to achieve a high transmission ratio in a very small axial installation space, by way of which transmission ratio the high rotational speed of the very high speed motors can be reduced to a rotational speed which is appropriate for the output of a motor vehicle. At the same time, this concept maintains the advantage of the addition of moments or torques of a plurality of electric machines with weak moments or torques to form an appropriately high torque.

The transmission stage is favorably configured as a friction roller mechanism. The structural complexity which is associated herewith is worthwhile with regard to the considerable reduction in the noise generation.

According to a further feature of the invention, a given one of the two sets of summing planets meshes with the summing internal gear; a given one of the two summing suns meshes with the given one of the two sets of summing planets; and the transmission internal gear is connected to the given one of the two summing suns.

In a preferred embodiment, the transmission internal gear is thus connected to that summing sun which meshes with that summing planetary set which meshes with the summing internal gear. This takes the different rotational directions and rotational speeds into consideration in an optimum way, which prevail at the output elements of the transmission stage, in particular in the preferred case where the transmission planets are configured as multi-step planets, the contact radius of which with the transmission sun is smaller than their contact radius with the transmission internal gear.

According to yet a further feature of the invention, the electric drive includes:

a differential having an input element and two output elements;

a driven axle of a motor vehicle, the driven axle having drive wheels;

the summing spider being connected, as an output element of the summing stage, to the input element of the differential; and the two output elements of the differential being connected to the drive wheels of the driven axle.

Two different variants, in particular, are favorable for the further configuration of the output. It is provided in a first variant that, as output element of the summing stage, the summing spider is connected to an input element of a differential, the two output elements of which are connected to drive wheels of a driven axle of a motor vehicle. This variant embodies the adaptation to the conventional drive concept of motor vehicles, in which a central drive drives a differential which distributes the moment to the two drive wheels of the driven axle.

According to another feature of the invention, the differential is a spur gear differential having two sets of differential planets meshing with one another; the input element of the differential is configured as a differential spider; the two sets of differential planets are mounted rotatably on the differential spider; each of the two sets of differential planets meshes with a respective one of the two output elements of the differential; and the two output elements of the differential are configured as differential suns.

In principle there are no essential restrictions for configuring the differential in this case. It is provided in a structurally particularly simple embodiment which saves installation space that the differential is a spur gear differential, the input element of which is configured as a differential spider, on which two sets of differential planets which mesh with one another are mounted rotatably, each differential planetary set meshing with one of the output elements of the differential which are configured as differential suns. This is the usual configuration of spur gear differentials with two suns.

According to another feature of the invention, the summing stage is connected, via the summing spider, to the differential spider.

According to yet another feature of the invention, the summing spider and the differential spider together form a common spider having two spaced-apart axial regions; and the summing planets and the differential planets are mounted on the two spaced-apart axial regions of the common spider.

As has already been explained above, the summing spider serves as output element of the summing stage. It is therefore preferably provided that the summing spider is connected to the differential, in particular its input element which is preferably the differential spider. This configuration results in the particularly advantageous possibility of mounting the summing planets and the differential planets on two spaced apart axial regions of a common spider. In other words, the summing spider and the differential spider are configured as one common component, which corresponds to a construction which is particularly space-saving.

Instead of the above-described differential, it is provided in a second variant of the output configuration that, as output element of the summing stage, the summing spider is connected to a drive wheel of a motor vehicle. This is the configuration of the output configuration as direct wheel drive. A direct wheel drive of this type is conceivable for one or more wheels of a motor vehicle. In other words, according to another feature of the invention, the summing spider is connected, as an output element of the summing stage, to a drive wheel of a motor vehicle.

Particularly preferable is a drive configuration for a motor vehicle, including two electric drives of this type which are oriented in an antiparallel manner with respect to one another and the summing stages of which are connected in each case to a drive wheel of the motor vehicle. An arrangement of the electric machines of both wheel drives in a common motor ring is particularly space-saving axially here, in each case two azimuthally adjacent motors being oriented in an axially antiparallel manner. In other words, the status and rotors of the two drives are arranged in a common motor ring plane, the rotor shafts protruding with the transmission planets fixed thereon out of the motor ring in different directions. Accordingly, in each case one transmission stage and one summing stage are arranged on both sides of the motor ring, the summing stage being connected to the respectively associated drive wheel of the motor vehicle. The function of the differential which is missing in the embodiment is realized by way of suitable actuation of the different drives, in particular of the motors which are assigned to the different drives. Here, more complex control operations which go beyond the conventional differential functions, such as what is known as torque vectoring, can also be realized.

With the objects of the invention in view there is thus also provided, a drive configuration for a motor vehicle, including:

drive wheels;

two electric drives oriented in an antiparallel manner with respect to one another;

each of the two electric drives respectively including a motor configuration, an output configuration and a transmission stage, the motor configuration in each case having a plurality of electric machines, the output configuration in each case having a summing stage configured as a Ravigneaux set with a summing internal gear fixed relative to a housing, with a summing spider, with two sets of summing planets meshing with one another and being rotatably mounted on the summing spider, one of the two sets of summing planets meshing with the summing internal gear, and with two summing suns each meshing with a respective one of the two sets of summing planets, the transmission stage being connected to the motor configuration and also connected to the output configuration, the transmission stage having a transmission sun and a plurality of transmission planets, the transmission sun being connected to the output configuration, the transmission planets each being connected to a respective one of the electric machines, the transmission planets being disposed in an annular manner around the transmission sun, the transmission planets rolling on the transmission sun in a torque-transmitting manner, the transmission stage having a rotatably mounted transmission internal gear, the transmission planets rolling on the transmission internal gear in a torque-transmitting manner, the transmission internal gear being fixedly connected to one of the two summing suns, and the transmission sun being fixedly connected to another one of the two summing suns;

the summing spider of the summing stage of a first one of the two electric drives being connected, as an output element of the summing stage of the first one of the two electric drives, to a first one of the drive wheels; and the summing spider of the summing stage of a second one of the two electric drives being connected, as an output element of the summing stage of the second one of the two electric drives, to a second one of the drive wheels.

Other features which are considered as characteristic for the invention are set forth in the appended claims.

Although the invention is illustrated and described herein as embodied in an electric drive and a drive configuration for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
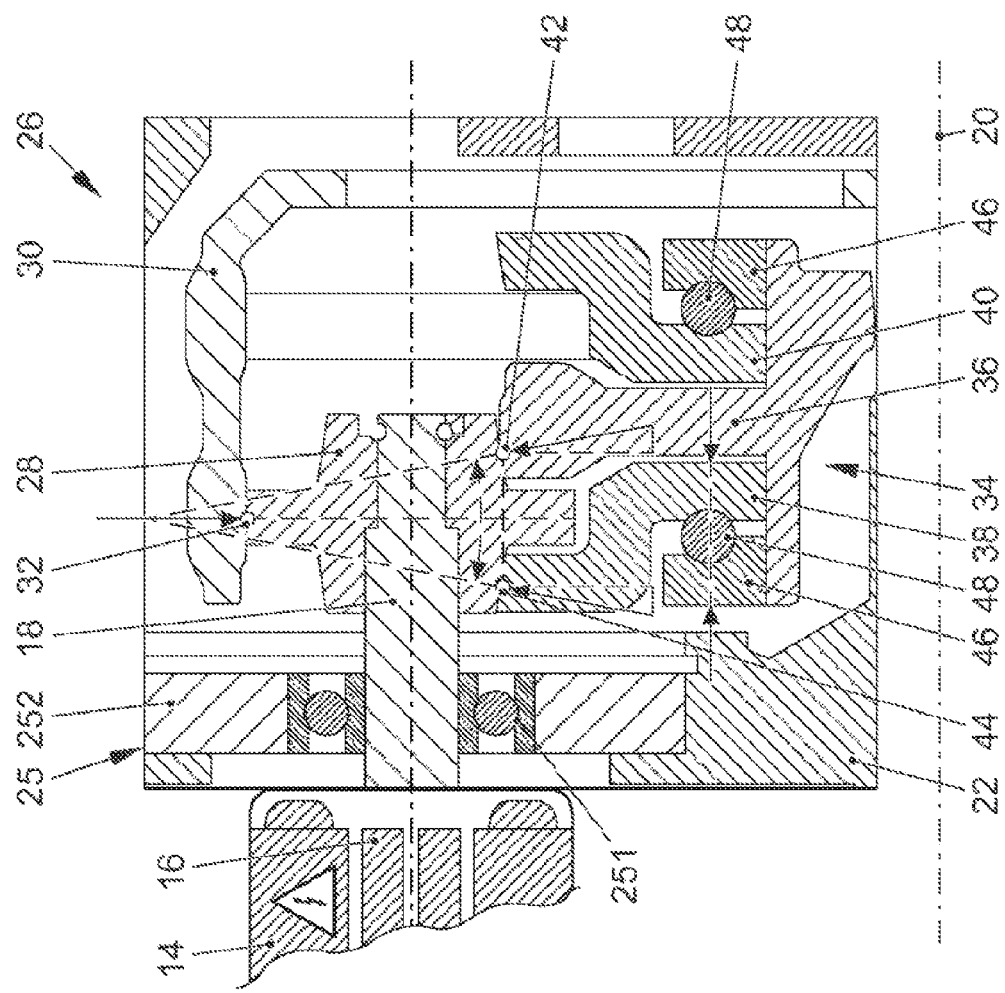
FIG. 1 is a diagrammatic sectional view of the transmission stage of a preferred embodiment according to the invention.
Figure 2:
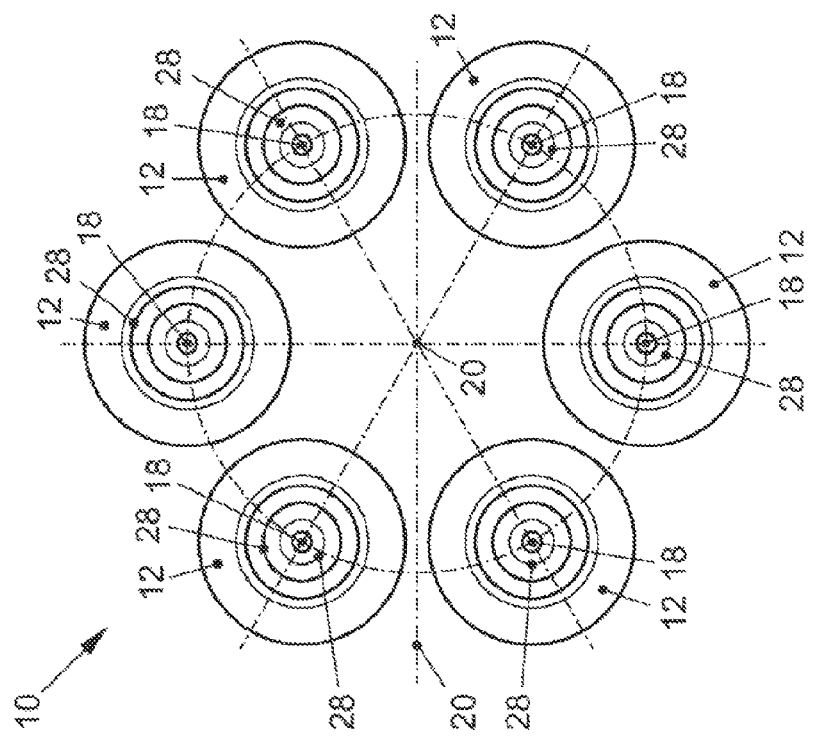
FIG. 2 is a diagrammatic elevational view of the front side of the motor configuration of a preferred embodiment according to the invention when viewed from the transmission stage side.

Referring now to the figures of the drawings in detail, in which identical reference characters in the figures indicate identical or analogous elements, and referring first, particularly, to FIG. 1 thereof, there is shown a diagrammatic sectional illustration of the transmission stage of a drive according to the invention. FIG. 1 is conveniently viewed together with FIGS. 2, 3, and 4 which are explained together for easier understanding. The motor configuration 10 which is illustrated, in particular, in FIGS. 2, 3, and 4 includes a plurality of (six in the embodiment which is shown) electric machines 12, in each case including a stator 14 and a rotor 16 which are disposed, with rotor shafts 18 which are oriented in parallel, in an annular manner around a central axis 20 and form a motor ring. The electric machines 12 are preferably very high speed machines which can be operated at rotational speeds of above 20 000 rpm. Whereas the stators 14 of the electric machines 12 are fixed on a housing 22, the rotor shafts 18 are mounted on the housing on both sides of the rotors 16; the specific configuration of the bearings 24, 25 is to be described in detail further below.

On one side of the electric machines 12, their rotor shafts 18 are extended and protrude into an adjacent transmission stage 26. There, they carry in each case one transmission planet 28 which is configured as a friction roller, is configured as a multi-step planet and has a greater diameter in a central axial region than in its outer axial regions which are arranged on both sides of the central region. The transmission planets 28 are fixed firmly on the rotor shaft 18. They together form the driven input element of the transmission stage 26. This is configured as a friction roller planetary stage. A rotatably mounted internal gear 30 is disposed radially on the outside, which makes frictional contact with the central region of the transmission planet 28 in a contact region 32, with the result that it is set in rotation by way of the driven rotational movement of the transmission planets 28 themselves. A transmission sun 34 of multiple-piece configuration is arranged radially within the transmission planets 28. The transmission sun 34 includes an inner sun wheel 36 which is mounted in an axially fixed and rotatable manner, and two outer sun wheels 38, 40 which are likewise disposed rotatably, but additionally axially displaceably. The transmission planet 28 which is shown in FIG. 1 is clamped between the inner sun wheel 36 and the outer sun wheel 38 in such a way that both make frictional contact by way of their contact regions 42, 44 with the outer axial regions of the transmission planets 28 which are configured with outwardly sloping shoulders. In addition to the rotation of the transmission internal gear 30, the motor drive of the transmission planets 28 therefore brings about a rotation in the opposite direction of the transmission sun 34, the rotational speed ratios between the transmission internal gear 30 and the transmission sun 34 resulting from the ratio of the respective contact radii between transmission planets 28 and transmission internal gear 30 on the one hand and transmission planets 28 and transmission sun 34 on the other hand. This ratio, in particular the precise contact radius between the transmission planets 28 and the transmission sun 34, is variable to a minor extent. This variability does not serve primarily to set the transmission ratio, but rather to optimize the slip within the transmission stage 26 which is configured as a friction roller planetary stage. In the embodiment which is shown, in particular, slip control is realized which is dependent on the torque, in particular is proportional to the torque. To this end, a spur disk pressure wheel 46 which is connected fixedly to the inner sun wheel 36 is disposed in each case adjacently axially on the outside with respect to the outer sun wheels 38, 40. Each outer sun wheel 38, 40 is supported via spacer elements 48 which are guided in ramps against the respectively associated spur disk pressure wheel 46. A relative moment or relative torque which occurs during motor drive of the transmission planets 28 between the inner sun wheel 36 and the outer sun wheels 38, 40 leads to a relative rotation of the outer sun wheels 38, 40 with respect to their respectively associated spur disk pressure wheel, which leads to a corresponding axial displacement of the respective outer sun wheel 38, 40 on account of the ramp guidance of the spacer elements 48. As a result, the contact pressure between the transmission sun 34 and the transmission planets 28 is set in a manner which is dependent on the torque to be transmitted, in particular is proportional to the latter. On account of the slope of the contact regions 42, 44 between the transmission sun 34 and the transmission planets 28, this additionally leads to a slight radial displacement of the transmission planets 28 and therefore to a corresponding change in contact pressure in the contact region 32 between the transmission planets 28 and the transmission internal gear 30. This transmission region is preferably kept axially flat, such that the result is no change with regard to the contact pressure or the contact radius between the transmission planets 28 and the transmission internal gear 30 in the case of a slight axial displacement of the transmission planets 28.

Figure 3:
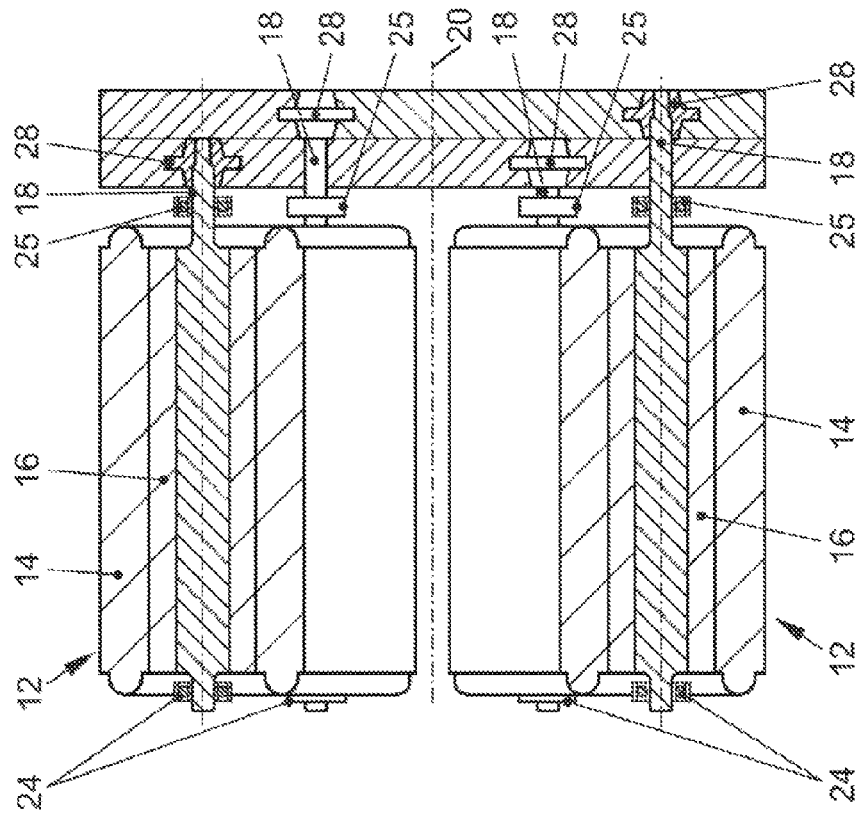
FIG. 3 is a diagrammatic partially sectioned side view of the motor configuration of a preferred embodiment according to the invention.
Figure 4:
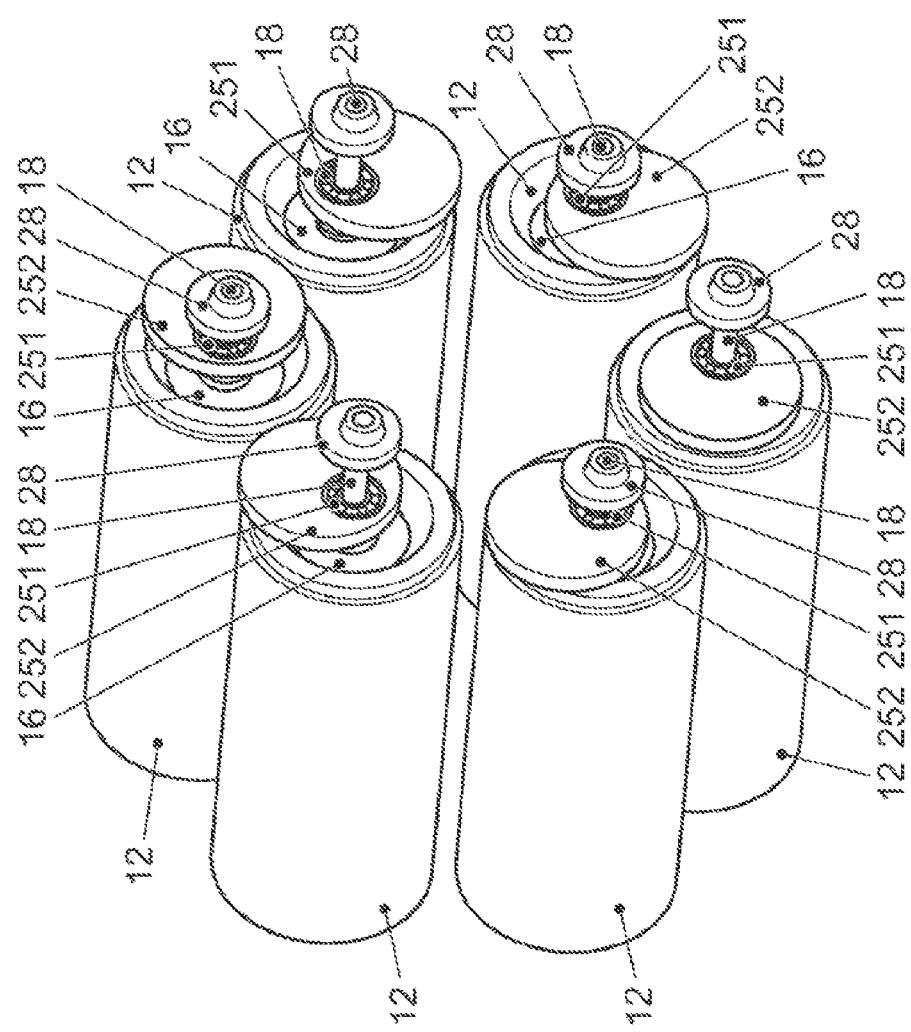
FIG. 4 is a perspective view of the motor configuration of FIGS. 2 and 3 with illustrated eccentric bearings in accordance with the invention.

The significance of the double configuration of the outer sun wheels 38, 40 is inferred, in particular, from the illustration of FIG. 3. In the embodiment which is shown, three of the six electric machines 12 are namely equipped with a shorter rotor shaft 18 and the three remaining electric machines 12 are equipped with a longer rotor shaft 18. Accordingly, they reach to a greater or lesser extent into the transmission stage 26, with the result that in each case two transmission planets 28 which are adjacent azimuthally with respect to one another interact with the same inner sun wheel 36, but with different outer sun wheels 38, 40. This interaction in groups of in each case three electric machines 12, as shown in the figures, is particularly advantageous, but is not absolutely necessary.

As mentioned, the contact pressure control between the transmission sun 34 and the transmission planets 28 is associated with a slight axial and radial displacement of the latter. This is not without problems insofar as they are fixed firmly on the rotor shafts 18 of the electric machines 12. This movement is therefore also continued on the respective rotor shaft 18, which should be taken into consideration when mounting it.

Figure 5:
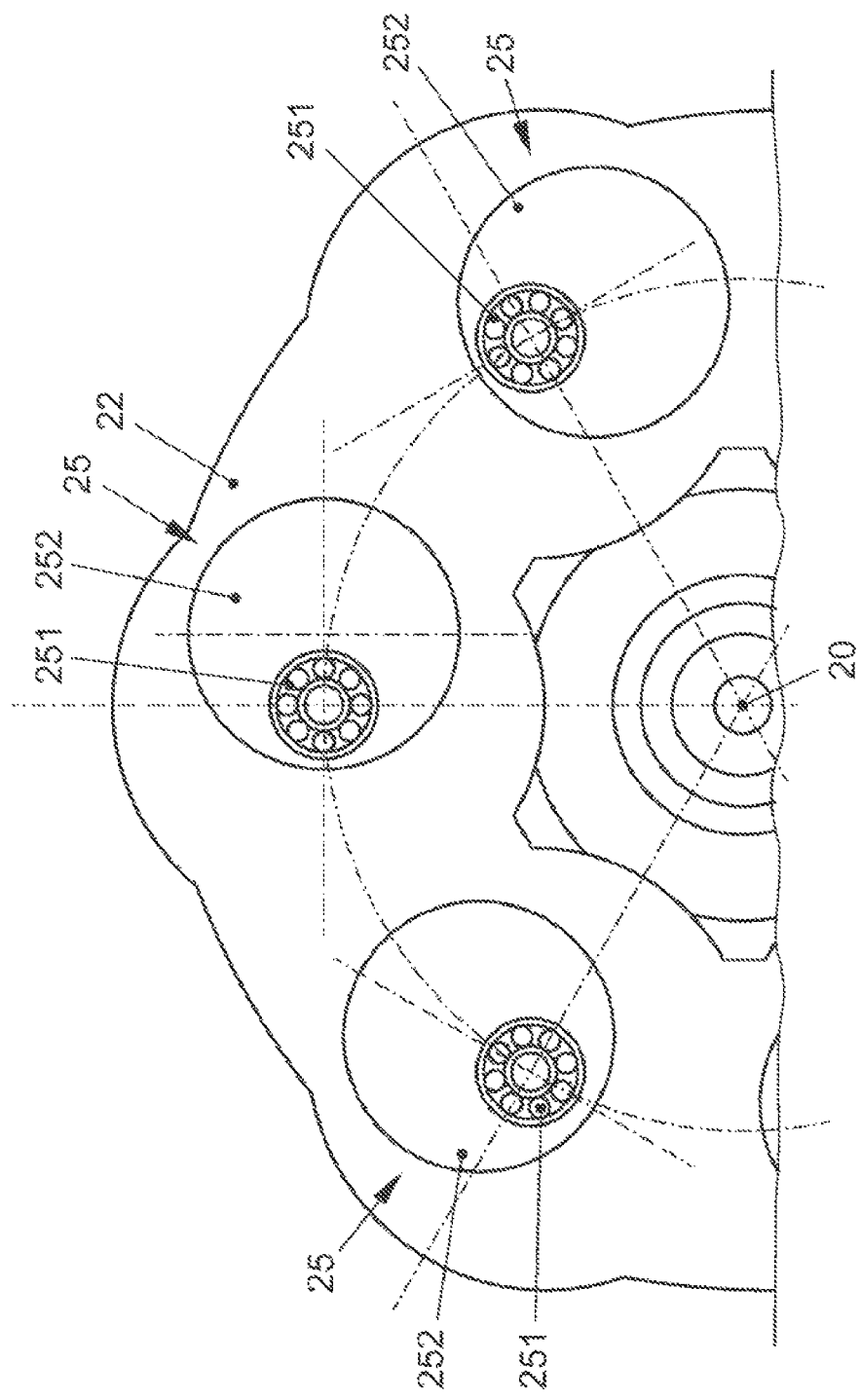
FIG. 5 is a diagrammatic view of the housing cover which separates the motor configuration of FIGS. 2 to 4 from the transmission stage of FIG. 1, in order to clarify the function of the eccentric bearings in accordance with the invention.

The bearings 24 which are positioned on that side of the electric machines 12 which faces away from the transmission stage 26 are configured as floating ball bearings. They absorb radial forces, but do not provide a resistance either to axial forces or to a tilting moment. This is sufficient, since the bearing location of the bearing 24 can be considered to be a pivot point of a tilting movement which results from a radial displacement of the associated transmission planet 28. In contrast to this, the bearings 25 which lie on that side of the electric machines which faces the transmission stage 26 have to have a radial degree of freedom. However, they have to absorb forces in the tangential direction, in relation to the motor ring, at the same time. They are therefore configured as eccentric bearings 25, as can be seen from FIGS. 4 and 5, in particular. The eccentric bearings 25 of the embodiment which is shown include in each case a ball bearing 251 which is fixed eccentrically in the bearing plate (eccentric plate) 252 which for its part is mounted rotatably in a cover of the housing 22. The eccentricity of the eccentric bearing 25, that is to say the directed spacing between the center of the ball bearing 251 and the bearing plate 252, is oriented in the tangential direction, in relation to the motor ring. A radial displacement of the transmission planets 28 which takes place in the context of the contact pressure adaptation therefore leads to a tangentially parallel offset, in relation to the bearing plate 252, that is to say a circular translation of the ball bearing 251. On account of the minor nature of the displacements which occur in the context of the contact pressure adaptation, the movement can be considered to be linear; its actual circular track character can be ignored.

Figure 6:
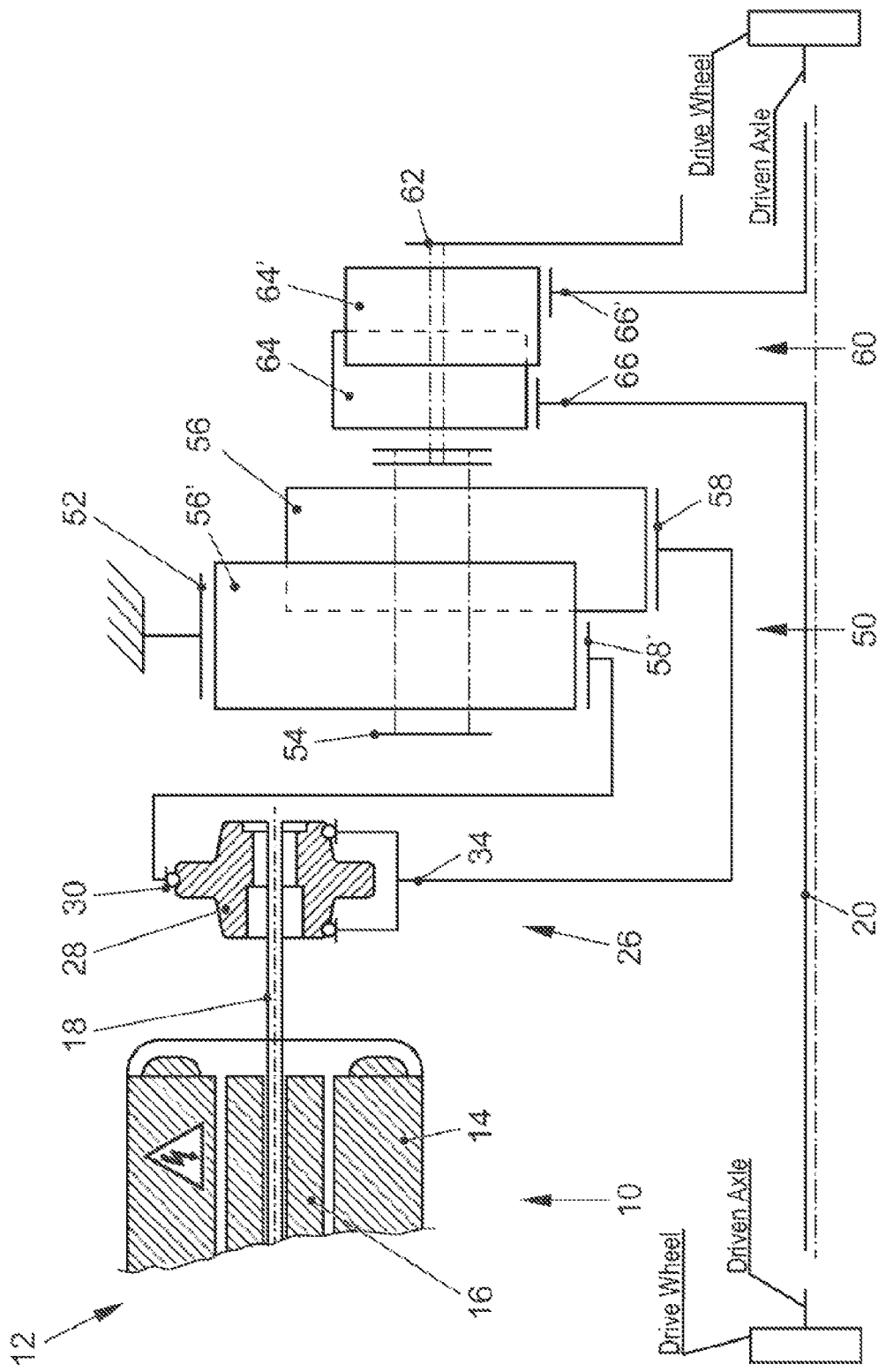
FIG. 6 is a diagrammatic view of a first embodiment of a drive configuration using the invention.

FIG. 6 shows the motor configuration 10 and the transmission stage 26 in a greatly simplified illustration, in order to illustrate their coupling to following output elements of a motor vehicle drive configuration. As explained in detail above, the transmission internal gear 30 and the transmission sun 34 serve as output elements of the transmission stage 26. They are coupled to the input elements of a following summing stage 50 which is configured in the form of a preferably spur-toothed Ravigneaux set. The latter has a summing internal gear 52 which is fixed relative to the housing, and a summing spider 54, on which two sets of summing planets 56, 56' which mesh with one another are mounted. Furthermore, the summing planetary sets 56, 56' mesh with two summing suns 58, 58' which serve as input elements of the summing stage 50 and are correspondingly connected to the transmission sun 34 or the transmission internal gear 30. The summing stage 50 serves to combine the different rotational speeds and torques which prevail on the transmission internal gear 30 and the transmission sun 34.

In the embodiment of FIG. 6, a spur gear differential 60 is provided in order to forward the rotational movement which is summed in the summing stage 50, which spur gear differential 60 is embodied in a usual configuration with a differential spider 62, on which two sets of differential planets 64, 64' which mesh with one another are mounted. The differential planetary sets 64, 64' mesh with two differential suns 66, 66' which serve as output elements of the differential 60 and are connected in each case to a drive wheel of a motor vehicle. The drive wheels of a driven axle are only schematically shown in FIG. 6. In the particularly preferred embodiment which is shown in FIG. 6, the summing spider 54 and the differential spider 62 form a common component with different axial sections, in one of which the summing planets 56, 56' are mounted and in the other of which the differential planets 64, 64' are mounted.

Figure 7:
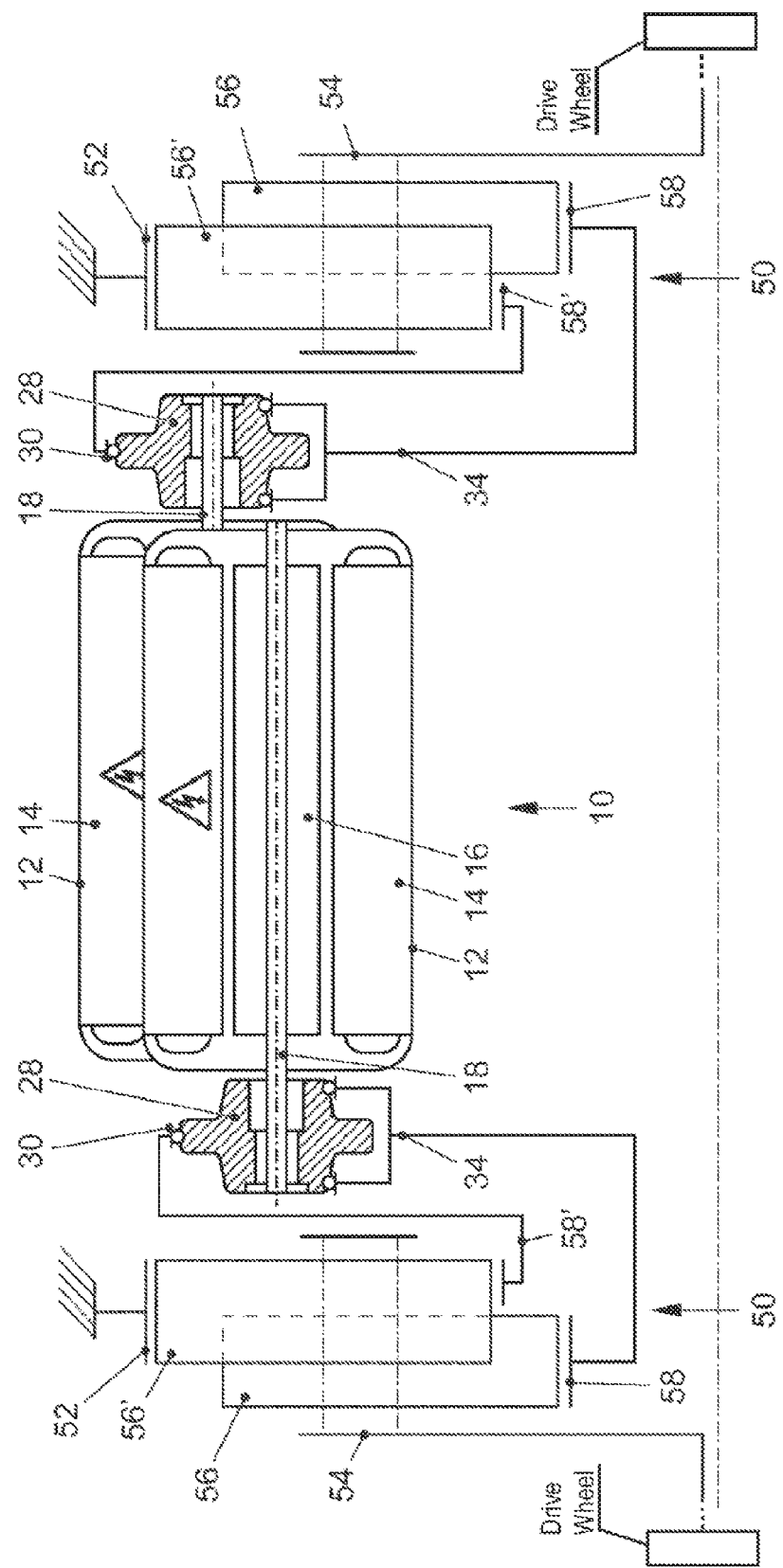
FIG. 7 is a diagrammatic view of a second embodiment of a drive configuration according to the invention.

FIG. 7 shows an alternative embodiment of a drive configuration for a motor vehicle, which embodiment dispenses, in particular, with a differential 60. In contrast to the illustration of FIGS. 2, 3, and 4, the electric machines 12 are arranged in an antiparallel manner with respect to one another in groups in this embodiment, with the result that a transmission stage and an adjoining summing stage 50 can be arranged on both sides of the motor ring. This configuration is shown in FIG. 7. Each of the two summing spiders 54 therefore forms an independent output element of the drive configuration, which output element is connected to a directly driven drive wheel of the motor vehicle. All of the differential functions and also functions which go beyond this, such as what is called torque vectoring, can be realized by way of corresponding actuation of the motor groups. It goes without saying that it would also be possible for a dedicated differential 60 to be connected downstream of each of the two summing stages 50 of the configuration of FIG. 7 and thus for two axles which are driven independently of one another to be realized.

The embodiments which are discussed in the specific description and are shown in the figures of course represent only illustrative exemplary embodiments of the present invention. In view of the disclosure here, a person skilled in the art is provided with a wide spectrum of possible variations.

LIST OF REFERENCE CHARACTERS

10 Motor configuration/motor ring
12 Electric machine
14 Stator of 12
16 Rotor of 12
18 Rotor shaft
20 Central axis
22 Housing
24 Bearing (floating bearing)
25 Bearing (eccentric bearing)
251 Ball bearing
252 Eccentric plate
26 Transmission stage
28 Transmission planet
30 Transmission internal gear
32 Contact region 28/30
34 Transmission sun
36 Inner sun wheel
38 Outer sun wheel
40 Outer sun wheel
42 Contact region 36/40
44 Contact region 36/38
46 Spur disk pressure wheel
48 Spacer element
50 Summing stage
52 Summing internal gear
54 Summing spider
56, 56' Summing planet
58, 58' Summing sun
60 Differential
62 Differential spider
64, 64' Differential planet
66, 66 Differential sun

What is claimed is:

1. An electric drive, comprising:
a motor configuration with a plurality of electric machines;
a housing;
an output configuration having a summing stage configured as a Ravigneaux set with a summing internal gear fixed relative to said housing, with a summing spider, with two sets of summing planets meshing with one another and being rotatably mounted on said summing spider, one of said two sets of summing planets meshing with said summing internal gear, and with two summing suns each meshing with a respective one of said two sets of summing planets; and
a transmission stage connected to said motor configuration and also connected to said output configuration, said transmission stage having a transmission sun and a plurality of transmission planets, said transmission sun being connected to said output configuration, said transmission planets each being connected to a respective one of said electric machines, said transmission planets being disposed in an annular manner around said transmission sun, said transmission planets rolling on said transmission sun in a torque-transmitting manner, said transmission stage having a rotatably mounted transmission internal gear, said transmission planets rolling on said transmission internal gear in a torque-transmitting manner, said transmission internal gear being fixedly connected to one of said two summing suns, and said transmission sun being fixedly connected to another one of said two summing suns.

2. The electric drive according to claim 1, wherein said transmission stage is configured as a friction roller mechanism.

3. The electric drive according to claim 1, wherein:
a given one of said two sets of summing planets meshes with said summing internal gear;
a given one of said two summing suns meshes with said given one of said two sets of summing planets; and
said transmission internal gear is connected to said given one of said two summing suns.

4. The electric drive according to claim 1, including:
a differential having an input element and two output elements;
a driven axle of a motor vehicle, said driven axle having drive wheels;
said summing spider being connected, as an output element of said summing stage, to said input element of said differential; and
said two output elements of said differential being connected to said drive wheels of said driven axle.

5. The electric drive according to claim 4, wherein:
said differential is a spur gear differential having two sets of differential planets meshing with one another;
said input element of said differential is configured as a differential spider;
said two sets of differential planets are mounted rotatably on said differential spider;
each of said two sets of differential planets meshes with a respective one of said two output elements of said differential; and
said two output elements of said differential are configured as differential suns.

6. The electric drive according to claim 5, wherein said summing stage is connected, via said summing spider, to said differential spider.

7. The electric drive according to claim 6, wherein:
said summing spider and said differential spider together form a common spider having two spaced-apart axial regions; and
said summing planets and said differential planets are mounted on said two spaced-apart axial regions of said common spider.

8. The electric drive according to claim 1, wherein said summing spider is connected, as an output element of said summing stage, to a drive wheel of a motor vehicle.

9. A drive configuration for a motor vehicle, comprising:
drive wheels;
two electric drives oriented in an antiparallel manner with respect to one another;
each of said two electric drives respectively including a motor configuration, an output configuration and a transmission stage, said motor configuration in each case having a plurality of electric machines, said output configuration in each case having a summing stage configured as a Ravigneaux set with a summing internal gear fixed relative to a housing, with a summing spider, with two sets of summing planets meshing with one another and being rotatably mounted on said summing spider, one of said two sets of summing planets meshing with said summing internal gear, and with two summing suns each meshing with a respective one of said two sets of summing planets, said transmission stage being connected to said motor configuration and also connected said output configuration, said transmission stage having a transmission sun and a plurality of transmission planets, said transmission sun being connected to said output configuration, said transmission planets each being connected to a respective one of said electric machines, said transmission planets being disposed in an annular manner around said transmission sun, said transmission planets rolling on said transmission sun in a torque-transmitting manner, said transmission stage having a rotatably mounted transmission internal gear, said transmission planets rolling on said transmission internal gear in a torque-transmitting manner, said transmission internal gear being fixedly connected to one of said two summing suns, and said transmission sun being fixedly connected to another one of said two summing suns;
said summing spider of said summing stage of a first one of said two electric drives being connected, as an output element of said summing stage of said first one of said two electric drives, to a first one of said drive wheels; and
said summing spider of said summing stage of a second one of said two electric drives being connected, as an output element of said summing stage of said second one of said two electric drives, to a second one of said drive wheels.

* * * * *